Dec. 17, 1940.  H. J. OTT  2,225,230
VELOCIPEDE
Filed Jan. 29, 1940   2 Sheets-Sheet 1
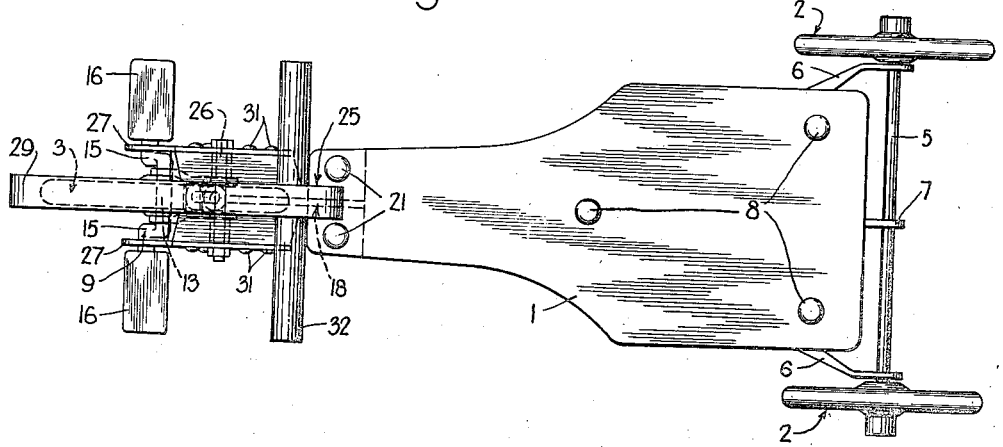
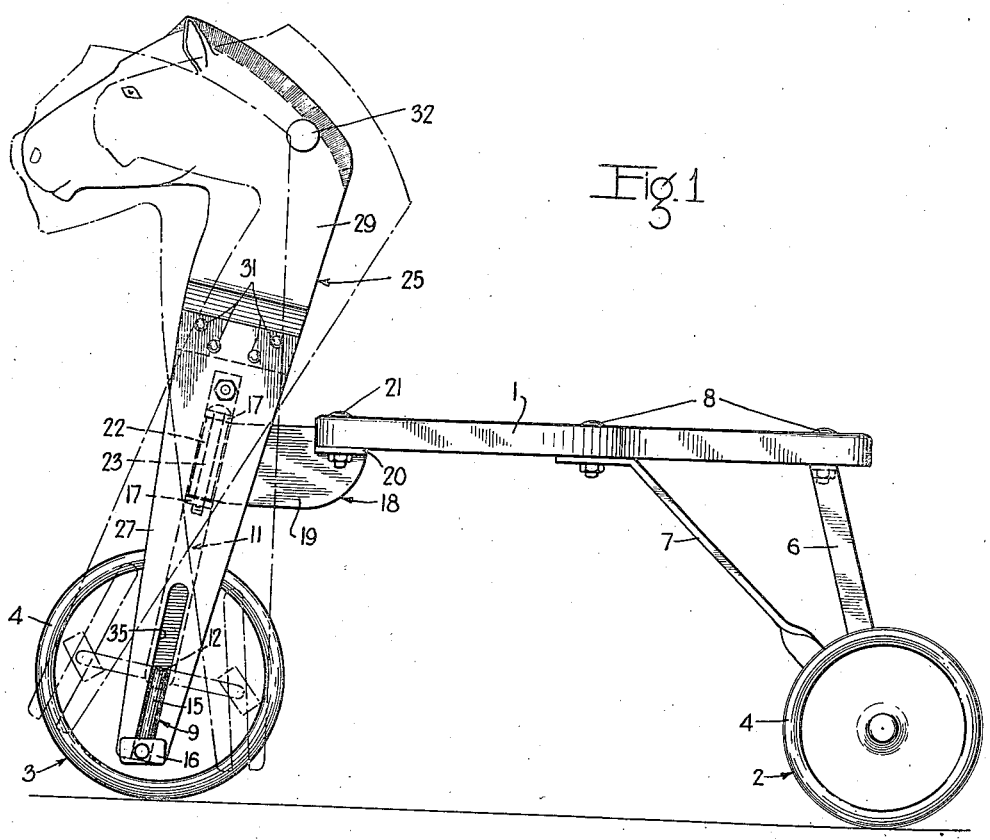
INVENTOR
HENRY J. OTT
BY
A. A. Steinmiller
ATTORNEY Dec. 17, 1940.  H. J. OTT  2,225,230
VELOCIPEDE
Filed Jan. 29, 1940   2 Sheets-Sheet 2
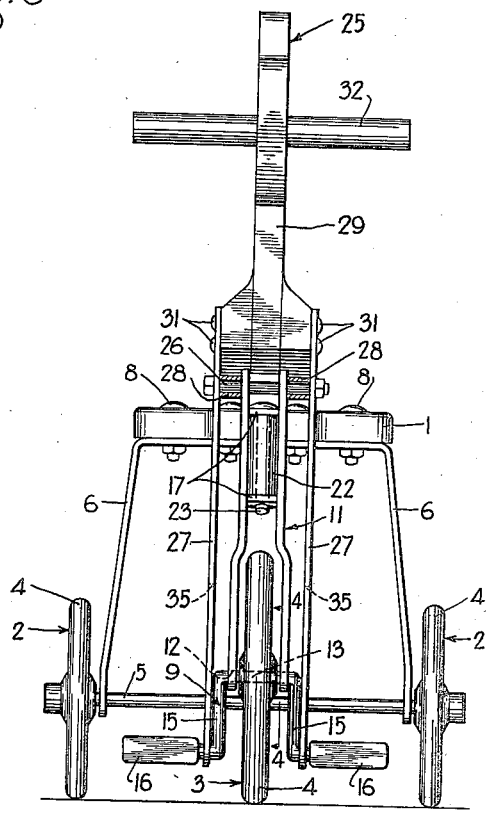
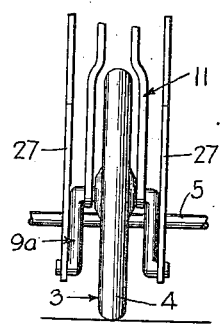
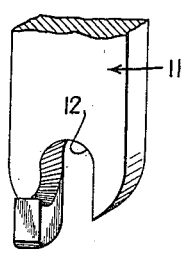
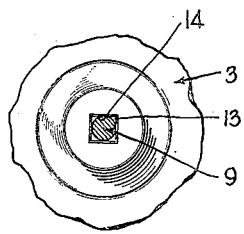
INVENTOR
HENRY J. OTT
BY
*A. A. Steinmiller*
ATTORNEY Patented Dec. 17, 1940

2,225,230

UNITED STATES PATENT OFFICE 2,225,230

VELOCIPEDE

Henry John Ott, Turtle Creek, Pa.

Application January 29, 1940, Serial No. 316,103

3 Claims. (Cl. 280—234)

This invention relates to velocipedes and has particular relation to velocipedes adapted to be propelled by hand-operated mechanism.

The principal object of my invention is to provide a velocipede of the "Kiddie Kar" type, wherein a novel arrangement is provided for steering and also propelling the velocipede.

Another object of my invention is to provide a velocipede, of the character indicated in the foregoing object, which is easy for young children to operate and which minimizes the possibility of injury to them.

The above objects, and other objects of my invention which will be made apparent subsequently, are attained by means of an embodiment of my invention hereinafter described and shown in the accompanying drawings wherein:

Fig. 1 is a side or elevational view of a velocipede embodying my invention,

Fig. 2 is a plan view of the velocipede shown in Fig. 1,

Fig. 3 is a front view of the velocipede shown in Fig. 1,

Fig. 4 is an enlarged fragmental sectional view taken on the line 4—4 of Fig. 3 showing the manner in which the front wheel is locked to its crank-axle, Fig. 5 is an enlarged fragmental view of the end of one arm of the front wheel steering fork, showing the manner of assembling the crank-axle of the front wheel on the fork, and Fig. 6 is a fragmental front view, similar to Fig. 3, showing a modified form of crank-axle having no foot pedals thereon.

Referring to the drawings, the velocipede shown comprises the usual seat board or member 1, pair of rear wheels 2, and single centrally disposed front wheel 3. The wheels 2 and 3 are of any desired construction although preferably of the metal disc type having suitable tires 4 of rubber or other friction material. If desired, the front wheel 3 may be of the same diameter as the rear wheels 2 although, as shown, the front wheel is larger in diameter than the rear wheels.

The rear wheels may be rotatably mounted in any suitable manner at the rear of the seat board 1. As shown, the rear wheels are rotatably mounted in spaced relation at opposite ends of an axle 5 that is in turn supported by brackets 6 and 7 attached to the rear end of the seat board 1 as by one or more bolts or rivets 8. Suitable lugs or collars, not shown, may be provided on the axle 5 to prevent spreading of the outside brackets 6 and the consequent friction thereof on the inner end of the rear wheel hubs due to the weight of the rider on the seat board.

The front wheel 3 is fixed or locked on a crank-axle 9 which is rotatably mounted, at the lower end of a steering fork 11, in suitable circular holes 12 provided in the fork arms.

The wheel 3 is locked on the axle portion 13 of the crank-axle in any suitable manner, as by providing a square or other polygonal hole 14 in the hub portion of the wheel and a mid-section on the axle portion 13 of corresponding cross-section, as shown in Fig. 4. The ends of the axle portion 13 are circular in cross-section and are rotatably supported in the holes 12 of the fork arms. The length of the square section of the axle portion 13 is slightly greater than the length of the front wheel hub and thus, with the wheel centered on the axle portion 13, the fork arms are spaced out of engagement with the wheel hub ends due to engagement with the shoulders formed on the axle portion between the square and circular sections thereof, thereby minimizing frictional resistance to rotation of the wheel.

As will be seen in Fig. 3, the crank-axle 9 is provided with a crank arm 15 on each end of the axle portion 13, each crank arm having a horizontally extending portion on which a foot-pedal 16 is rotatably carried in conventional manner. The two crank arms 15 are not spaced 180° with respect to each other, however, as is customary in the usual type of velocipede, but are in alignment with each other on the same side of the axle portion 13. It will be obvious that installation of the front wheel on the axle portion of the crank-axle is effected before one of the crank arms 15 is bent into its required position.

If desired, the ends of the fork arms may be provided with conventional split journals, not shown, to enable installation of the crank-axle 9 in the fork 11. I prefer, however, to simply cut open the end of each fork arm and then, by a suitable tool, bend the cut section laterally a sufficient amount to permit the entry of the axle portion of the crank-axle into the holes 12, thereafter bending the cut section back to the original position so as to confine the axle portion rotatably in the holes 12, in the manner indicated in Fig. 5. The character of the metal of which the fork arms is constructed should in this case be such as to permit bending of the cut end section thereof without breaking off and yet of sufficient strength and hardness to prevent distortion in service or excessive wear due to rotation of the axle portion of the crank axle in the holes 12. The just described method of installation of the crank-axle 9 in the fork 11 obviates special fittings or journals on the fork arms, thereby reducing the cost of manufacture.

The steering fork 11 has its two arms secured in spaced parallel relation by means of two vertically spaced connectors or lugs 17 which are riveted, welded, or otherwise suitably attached to the fork arms.

A bracket 18 is provided for pivotally mounting the steering fork 11 at the center of the front end of the seat board 1. Bracket 18 is of suitable cast or forged metal and comprises a vertically extending web 19 having formed at one end a pair of wings or flanges 20, adapted to be secured as by a plurality of bolts or rivets 21 to the underside of the seat board, and having formed at the opposite end a tubular portion 22 that is inclined backwardly from the perpendicular toward the seat board in a vertical plane.

The tubular portion 22 of the bracket 18 is adapted to be received in close-fitting relation between the lugs 17 of the fork 11; and a pivot bolt 23, slightly smaller in diameter than the interior bore of tubular portion 22, is inserted through suitable holes in the lugs and through the bore of the tubular portion 22. Bolt 23 has a suitable head at the top end and a transverse hole at the bottom end for receiving a cotter pin, in the manner shown, whereby to hold the bolt in place. Fork 11 is thus correspondingly inclined backwardly from the perpendicular toward the seat board, thereby preventing or minimizing the possibility of the velocipede "nosing" over in the event that the front wheel 3 strikes a bump or other unevenness in the sidewalks or pavements.

According to my invention, I further provide a hand-oscillated yoke 25 adapted, in the manner presently described, to exert a undidirectional torque on the crank arms 15 of the crank-axle 9 in response to its oscillation, thereby effecting rotation of the front wheel 3 and the consequent propulsion of the velocipede, the yoke 25 being at the same time effective to turn the steering fork 11 to a desired position on its pivot bolt 23.

To this end, the yoke 25 is disposed in straddling relation over the upper end of the fork 11, as shown in Fig. 3, and is pivoted on a bolt 26 that extends laterally through suitable holes in the upper ends of the fork arms at a point above the bracket 18. In order to maintain the fork 11 centered between the side arms 27 of the yoke 25, a pair of tubular spacers 28 are provided on the bolt 26 between the yoke arms and the arms of the fork 11. The bolt 26 is provided with a suitable nut on the threaded end thereof which may be suitably locked in a desired position of adjustment.

Yoke 25 may be constructed in any suitable manner. As shown, the two side arms 27 thereof are attached, in spaced substantially parallel relation, at the upper ends thereof to opposite sides of an upper spacing member 29, as by a plurality of through bolts or rivets 31. The side arms 27 are preferably of sheet steel having a suitable thickness, such as $\frac{1}{16}$ or $\frac{1}{8}$ of an inch to provide the necessary rigidity and strength. The upper member 29 is preferably of wood, fiber, hard rubber or other similar non-metallic material to minimize weight and may be formed in any desired contour, such as that of a horse's head. If desired, the opposite sides of the upper member 29 may also be suitably painted or decorated to more clearly depict the figure represented.

In order to provide for a suitable grasp on the upper member 29, a handle 32 is provided. As shown, handle 32 may be an integral circular rod, of wood, fiber, hard rubber or like material of suitable strength, secured as by a press fit in a transverse hole in the upper member 29, with substantially equal lengths on opposite sides of the member 29.

As shown in Fig. 1, the flat side of the yoke arms 27 tapers downwardly toward the crank arms 15 of crank-axle 9 and the yoke arms are of such length as to extend below the lowest point in the circular locus of travel of the horizontal end portions of the crank arms on which the foot pedals 16 are carried. Cut or formed in the lower end of each yoke side arm 27 is a slot 35 which is open to the end of the arm and which extends longitudinally upward in the arm midway between the edges thereof, the slot 35 in each yoke arm being adapted to receive therein close-fitting slidable relation the horizontal portion of the crank arm 15 on the corresponding side of the front wheel. The slots 35 are longer than the "throw" of the ends of the crank arms 15 for a reason presently to be made apparent.

In operation, propulsion of the velocipede is best initiated by employing the foot pedals 16 to assist in applying a torque to the crank-axle 9. To do this the rider may first shift the velocipede forwardly or backwardly, as by placing his feet on ground and thereby pushing or pulling the velocipede, until the foot pedals 16 are approximately in the forward position thereof as shown by the broken lines in Fig. 1. The yoke 25 is thereby correspondingly rocked into a position, indicated by the outline thereof in broken lines, displaced in a clockwise direction from the centered position shown in solid lines, due to the cooperation of the crank arms 15 with the slots 35 in the yoke side arms 27.

In starting the velocipede, the rider may press downwardly with his feet on both foot pedals and at the same time push with his hands on the handle 32 in a direction away from his body. A torque is thus applied on the crank arms 15 in a direction so as to rotate the front wheel in a counterclockwise direction, as seen in Fig. 1. As the front wheel thus turns or rolls in a direction to propel the velocipede forwardly, the yoke 25 is correspondingly rocked toward the central position indicated in solid lines and, at the same time, the horizontal portions of the crank arms 15 slide in the slots 35 to the extreme outer position thereof in the slots near the lower end of the yoke arms, as shown. Thereafter, as the crank arms continue to turn further in the counterclockwise direction, the horizontal portions of the crank arms slide inwardly in the slots 35 and the yoke 25 correspondingly rocks further in the counterclockwise direction, as indicated by the second outline of the yoke in broken lines.

The momentum of the velocipede, of course, carries the crank arms 15 through the righthand dead center position thereof in which the crank arms are at a right angle to the slots 35 and, substantially at the time the crank arms reach such position, the rider ceases to exert a push on the handle 32 and, instead, exerts a pull thereon. The crank arms having been carried past the dead center position, the pull exerted on the yoke handle 32 now causes a component of force to be exerted on the crank arms which continues to urge them in a counterclockwise direction.

When the yoke 25 again reaches the position indicated in solid lines in Fig. 1, the horizontal portions of the crank arms 15 attain their extreme inner position at the upper end of the slots 35. The reason for having the slots 35 longer than the throw of the crank arms 15 should now be apparent.

As the rider continues to pull on the yoke handle 32, the front wheel continues to roll forwardly while the crank arms turn correspondingly. Substantially at the time that the crank arms reach their left-hand dead center position in which they are again at a right angle to the slots 35, the rider ceases to pull on the yoke handle 32 and again exerts a push thereon. Once the crank arms are past their left-hand dead center position the pushing force applied to the yoke handle again causes a force to be applied urging the cranks in a counterclockwise direction.

It will thus be apparent that by alternately pulling and pushing on the yoke handle, a unidirectional torque force is continuously applied to maintain the rotation of the front wheel and consequently the propulsion of the velocipede. Thus, although the foot pedals 16 may be employed to assist in starting the velocipede, the oscillation of the yoke, without the use of the foot pedals except for a foot rest, is sufficient to maintain the velocipede in motion.

It will be seen that due to the manner of mounting the yoke 25 on the steering fork 11, the velocipede may be readily steered by means of the yoke handle 32 at the same time that force is exerted on the handle to propel the velocipede, thus providing a very simple arrangement for young children to learn to operate. At the same time the back-and-forth motion of the horse's head at the upper end of the yoke, simulating as it does the bobbing of a horse's head while running, has an appeal for young children not attained by the conventional "Kiddie Kar."

I have found that the provision of the wheel tires 4 of rubber or similar friction material is desirable, especially for the front wheel 3, because of the higher traction or adhesion of the wheel to the road surface thereby obtained. Slipping of the front wheel on starting is minimized if not entirely prevented, thereby enabling easier starting.

If desired, a modified form of crank-axle 9a, having no foot pedals 16 on the crank arms thereof, may be provided, as shown in Fig. 6.

While I have shown and described only one specific embodiment of my invention and one modification thereof, I do not intend any limitations except those defined by the terms of the appended claims.

What I claim as new and desire to secure by Letters Patent, is:

1. A velocipede of the type having a seat member, two rear wheels and a single front wheel, comprising a steering fork for the front wheel pivotally mounted at the front end of the seat member, a crank-axle for rotatably mounting the front wheel in said fork and effective upon rotation to cause rotation of the front wheel, and a yoke so pivotally mounted on said fork as to be oscillated by the rider forwardly and backwardly with respect to said seat member and so constructed and arranged as to turn the steering fork to a desired steering position, said yoke having two side arms disposed in straddling relation to the said fork, each of said side arms having a slot extending longitudinally thereof for receiving and confining a corresponding end of the crank-axle so that, upon oscillation of said yoke forwardly and backwardly, said yoke applies a unidirectional torque on the crank-axle resulting in rotation of the front wheel and the consequent propulsion of the velocipede.

2. A velocipede of the type having a seat member, two rear wheels and a single front wheel, comprising the combination of a steering fork for the front wheel pivotally mounted at the front end of the seat member, a crank-axle having an axle portion to which said front wheel is fixed for rotatably mounting the front wheel in said fork and having aligned crank arms at the opposite ends and on the same side of the axle portion, and a yoke pivotally mounted on said fork in straddling relation thereto so as to be oscillated by the rider forwardly and backwardly with respect to the seat member and so interlocked with said fork as to cause turning of said fork on its pivot in response to turning of the yoke, said yoke having in each of the two side arms thereof on opposite sides of said fork a slot that extends longitudinally of the arm and in which the crank arm on the corresponding end of the crank-axle is received so that, upon oscillation of said yoke forwardly and backwardly, said yoke exerts a unidirectional torque on the crank-axle resulting in rotation of the front wheel and the consequent propulsion of the velocipede.

3. A velocipede of the type having a seat member, two rear wheels and a single front wheel, comprising the combination of a steering fork for the front wheel pivotally mounted at the front end of the seat member, a crank-axle having an axle portion to which said front wheel is fixed for rotatably mounting the front wheel in said fork and having aligned crank arms at the opposite ends and on the same side of the axle portion, and a yoke pivotally mounted on said fork in straddling relation thereto so as to be oscillated by the rider forwardly and backwardly with respect to the seat member and so interlocked with said fork as to cause turning of said fork on its pivot in response to turning of the yoke, said yoke having in each of the two side arms thereof on opposite sides of said fork a slot open to the lower end of the side arm and extending longitudinally of the arm a distance longer than the throw of the crank arms, the crank arm at each end of the crank-axle having a horizontal portion received in the slot of the corresponding yoke side arm so that upon oscillation of the yoke forwardly and backwardly a unidirectional torque is exerted on the crank-axle to cause rotation of the front wheel and the consequent propulsion of the velocipede.

HENRY J. OTT.